United States Patent
Zhou et al.

(10) Patent No.: US 8,249,192 B2
(45) Date of Patent: Aug. 21, 2012

(54) TECHNIQUES TO TRANSMIT DATA RATE CONTROL SIGNALS FOR MULTI-CARRIER WIRELESS SYSTEMS

(75) Inventors: Fei Frank Zhou, San Diego, CA (US); Zhigang Rong, San Diego, CA (US); Zhouyue Pi, San Diego, CA (US); Lin L. Ma, San Diego, CA (US)

(73) Assignee: Nokia Corporation, Espoo (FI)

( * ) Notice: Subject to any disclaimer, the term of this patent is extended or adjusted under 35 U.S.C. 154(b) by 1138 days.

(21) Appl. No.: 11/478,555

(22) Filed: Jun. 28, 2006

(65) Prior Publication Data
US 2007/0077955 A1    Apr. 5, 2007

Related U.S. Application Data

(60) Provisional application No. 60/700,095, filed on Jul. 18, 2005.

(51) Int. Cl.
*H04L 27/20* (2006.01)
(52) U.S. Cl. ........ 375/308; 375/148; 375/239; 375/279; 375/329; 375/136; 375/260; 375/267; 375/280
(58) Field of Classification Search .................. 370/209, 370/230, 235, 252, 335, 347, 468; 455/522; 375/136, 148, 239, 260, 267, 280, 329
See application file for complete search history.

(56) References Cited

U.S. PATENT DOCUMENTS

| | | | |
|---|---|---|---|
| 6,839,335 B1 | 1/2005 | Sudo | |
| 6,895,232 B2 * | 5/2005 | Parker | 455/313 |
| 7,065,060 B2 * | 6/2006 | Yun et al. | 370/318 |
| 7,184,426 B2 * | 2/2007 | Padovani et al. | 370/347 |
| 7,206,580 B2 * | 4/2007 | Black | 455/437 |
| 7,496,058 B2 | 2/2009 | Kim | |
| 2004/0179506 A1 | 9/2004 | Padovani et al. | |
| 2004/0266466 A1 * | 12/2004 | Kim et al. | 455/509 |
| 2005/0018782 A1 | 1/2005 | Costa et al. | |
| 2006/0018347 A1 | 1/2006 | Agrawal | |
| 2008/0151743 A1 * | 6/2008 | Tong et al. | 370/204 |

FOREIGN PATENT DOCUMENTS

| | | |
|---|---|---|
| CN | 1300141 A | 6/2001 |
| CN | 1463099 A | 12/2003 |
| EP | 1102422 A1 | 5/2001 |
| WO | 2007010349 A2 | 1/2007 |

(Continued)

OTHER PUBLICATIONS

International Search Report for Application # PCT/IB2006/001928, (Dec. 28, 2006).

(Continued)

*Primary Examiner* — Dhaval Patel
(74) *Attorney, Agent, or Firm* — Harrington & Smith

(57) ABSTRACT

Various embodiments are disclosed relating to techniques to transmit data rate control signals for multicarrier wireless systems. According to an example embodiment, a wireless apparatus may be adapted to transmit at least a first data rate control (DRC) value via an in-phase channel and at least a second DRC value via a Quadrature-phase channel. The first DRC value may be associated with a first forward link carrier and the second DRC value may be associated with a second forward link carrier. In this manner, DRC values may be transmitted over both the I and Q channels, for example.

17 Claims, 5 Drawing Sheets

FOREIGN PATENT DOCUMENTS

WO            2007010349 A3      1/2007

OTHER PUBLICATIONS

"3rd Generation Partnership Project 2 '3GPP2'", *cdma2000 High Rate Packet Data Air Interface Specification*, Version 1.0, (Mar. 2004),13-11 & 13-25.

Hara, Shinsuke, "Overview of Multicarrier CDMA", *IEEE Communications Magazine*, (Dec. 1997).

Kammeyer, Dr. K.D., "Code Division Multiple Access (CDMA)", (Jun. 2005).

Keuhn, Volker, "Channel Coding Aspects in an OFDM-CDMA System", *University of Bremen, Department of Telecommunications*, (Jan. 2000).

Qualcomm Incorporated, "cdma2000 Evolution Technical Summary", (Mar. 10, 2006).

Siemens, "Comparison of W-CDMA and cdma2000", (2002).

Yee, Nathan, "Multi Carrier CDMA in Indoor Wireless Radio Networks", (Sep. 8-11, 1993).

Yee, Nathan, "Multi-Carrier CDMA in Indoor Wireless Radio Networks", *Department of Electrical Engineering and Computer Science, University of California, Berkely*, (1993).

"An Architecture of CDMA 2000 Reverse Transmit Channel (RC3 Reference)", cdma2000 High Rate Packet Data Air Interface Specification, 3GPP2 C. S0024-A, Version 1, 4 pages.

Office Action for Chinese Application No. 200680021390.4 (with English Translation), mailed Mar. 29, 2010, 17 pages.

Sang, G. L., et al, "IMT-2000/CDMA Techniques", Sehwa Publishing Company, Chapters 7-10, 2 pages.

Application Serial No. 200680021390.4, Office Action mailed Oct. 8, 2011, 10 pages.

\* cited by examiner

TECHNIQUES TO TRANSMIT DATA RATE CONTROL SIGNALS FOR MULTI-CARRIER WIRELESS SYSTEMS

CROSS-REFERENCE TO RELATED APPLICATIONS

This application claims priority to U.S. Provisional Patent Application Ser. No. 60/700,095 filed on Jul. 18, 2005, hereby incorporated by reference.

BACKGROUND

Data rate control or rate adaptation is a feature found in a number different wireless technologies or networks in different forms, and often involves changing or updating a transmitted data rate based on some measurement and/or based on a control signal. For example, cdma2000 High Rate Packet Data system is one type of wireless technology and is commonly referred to as 1×DO ("data optimized") system. The 1×DO system is a single carrier system where Access Terminals (AT) or mobile terminals may communicate with the Access Network (AN) or base station over 1.25 MHz bandwidth in either the forward link (AN-to-AT link) or the reverse link (AT-to-AN link).

In the reverse link of the 1×DO system, there is an access channel mode (including a pilot channel and a data channel) that may be used by an AT to initiate communication with the AN, for example. The reverse link of the 1×DO system also includes a traffic channel mode that may be used by an AT to transmit traffic or signaling information to the AN. The traffic channel mode includes one or two pilot channels, three medium access control (MAC) channels, an acknowledgement (Ack) channel and a data channel. The MAC channels include a reverse rate indicator channel, a data rate control (DRC) channel and a data source control (DSC) channel. In the forward link of the 1×DO system, there is a pilot channel, a medium access control (MAC) channel, an acknowledgement (Ack) channel, a control channel and a traffic channel. The MAC channels include a reverse activity (RA) channel, a DRCLock channel and a reverse power control channel.

In the 1×DO system, the AT measures the signal-to-interference and noise ratio (SINR) during the pilot burst for a number of pilot signals. The AT then uses the measure SINR of the strongest pilot to determine the highest data rate it can reliably decode. The AT then uses the DRC channel (on the reverse link) to inform the AN of the desired data rate on the forward link (AN-to-AT link) and the selected cell sector.

Multi-carrier modulation is a modulation technique where data is modulated onto multiple carriers or subcarriers, rather than being modulated onto a single carrier. Orthogonal Frequency Division Multiplexing (OFDM) is an example of multi-carrier modulation where the subcarriers are orthogonal to each other. Multi-carrier Code Division Multiple Access (MC-CDMA) is another example multi-carrier technology that uses both multiple carrier and spreading codes that may have orthogonal properties. In each frequency band, the transmission technology or format may be similar to or the same as those used in a single carrier system.

Recently, multi-carrier 1×EV-DO (e.g., N×DO) has been proposed for cdma2000 evolution. For example, in a 1×DO variety, the AT and AN would communicate over a 5 MHz radio channel that provides 3 carriers, with a 1.25 MHz frequency band per carrier. An N×DO system is a multi-carrier system that allows ATs to communicate with AN over multiple 1.25 MHz bands—each band may utilize transmission technology and format similar to those used in a 1×DO system. Due to the frequency selective fading and other distortion that may occur independently on each carrier in such a multi-carrier system, it may be useful to allow data rate control information to be communicated between an AT and AN for each carrier.

There is a proposal to time division multiplex (TDM) the DRC values or DRC signals for multiple carriers over the Q (quadrature) branch of the transmitter. Qualcomm, "cdma2000 evolution technology summary," Presentation in cdma2000 evolution workshop, C00AIE-20050310-027R1, Mar. 10, 2005. In the proposal, the TDM reporting of DRC values uses a long DRC span of 8 slots and DRC length of 2 slots, and 4 DRC values are reported on one reverse link carrier every 13.3 ms. The drawbacks of such proposal include the long DRC span may reduce the forward link channel sensitive schedule gain. The default setting of DRCLength is 4 slots for soft handoff (SHO) region, and the DRC Gain may need to be increased to support a shorter DRCLength, such as a DRCLength of 2 slots. In addition, with all DRC values being reported on the Q-branch, this will typically increase the mobile transmitter's Peak to Average (P/A) ratio.

SUMMARY

Various embodiments are disclosed relating to techniques to transmit data rate control signals for multicarrier wireless systems.

According to an example embodiment a method is provided that may include determining a data rate control (DRC) value for each of a plurality of carriers, spreading the plurality of DRC values, and transmitting at least one or the plurality of spread DRC values via an in-phase (I) channel and at least one of the plurality of the spread DRC values via a Quadrature-phase (Q) channel.

According to another example embodiment, a wireless apparatus is provided. The wireless apparatus may be adapted to determine DRC values for each of a plurality of forward link carriers, and to transmit via a reverse link channel at least a first of the DRC values via an in-phase channel and at least a second of the DRC values via a Quadrature-phase channel.

According to another example embodiment, a wireless apparatus is provided. The wireless apparatus may be adapted to transmit at least a first data rate control (DRC) value via an in-phase channel and at least a second DRC value via a Quadrature-phase channel. The first DRC value may be associated with a first forward link carrier and the second DRC value may be associated with a second forward link carrier.

DETAILED DESCRIPTION

Figure 1:
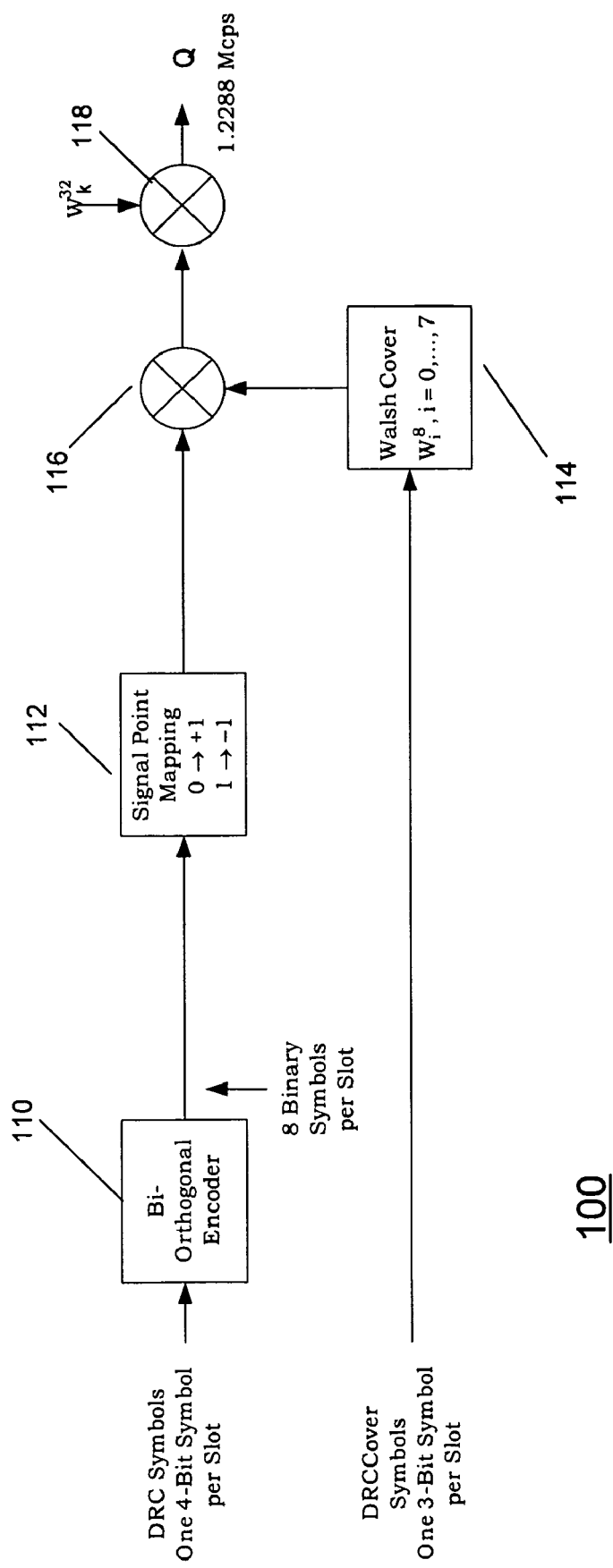
FIG. 1 is a block diagram illustrating a DRC channel according to an example embodiment.

According to an example embodiment, DRC signals for multiple carriers may be transmitted via the I (in-phase)

branch and the Q (quadrature phase) branch of an AT transmitter. For example, if there are three forward link carriers C1, C2 and C3, the AT may allocate the DRC signals of carriers C1 and C2, differentiated via first and second orthogonal (e.g., Walsh) codes on the Q-branch, and allocate the DRC signal for carrier C3 to the I-branch, e.g., via a third orthogonal (or Walsh) code. (The term DRC signal herein may, in some cases refer to the one or more DRC values transmitted on the reverse link for a carrier. There may be, for example, a DRC signal for each forward link carrier; although in some cases the terms DRC signal and DRC value may be used interchangeably).

In addition, by taking into account other channels (already) transmitted on the I-branch and Q-branch for the AT's reverse link, the DRC signals may be allocated to the I-branch and Q-branch in a manner that may substantially provide a load balancing or power balancing. In this manner, the AT transmitter's Peak to Average (P/A) ratio may be reduced for a multi-carrier system, as compared to transmitting all of the DRC signals on only the Q-branch or only the I-branch.

According to an example embodiment, each sector (or base station) may transmit a pilot signal (or pilot channel) for each carrier. For example, in a three carrier system, each sector or base station (of the AN) may transmit a pilot signal for each of carriers C1, C2 and C3.

Also, a DRC channel (for the AT's reverse link), may include the DRC signal (or symbol) for each carrier and a DRC cover (or Walsh cover) for each carrier and a DRC Length. In one embodiment, DRC and DRC cover values may be updated every DRC Length duration or longer. The AT may monitor a channel quality for each of the multiple carriers from multiple sectors or base stations. This may be performed, for example, by the AT monitoring the carrier-to-interference (C/I) ratio or some other channel quality related parameter for the pilot for each carrier from each of a plurality of sectors/base stations.

Based on the measured channel qualities (e.g., based on the C/I ratio for the received pilots from multiple sectors), the AT may select one of the sectors. For example, the selected sector or base station may be the best or highest quality sector or base station from which it can reliably receive the forward link traffic at the highest rate for the carriers (or for one or more of the carriers), although the disclosure is not limited thereto. In an example embodiment, the selected sector or base station may be the sector having the highest quality pilot signals for one or more (or all) of the carriers (e.g., the sector having the highest C/I ratio on one or more of its carriers as compared to other sectors).

Also, for each sector in an active set of sectors for the AT, the AT may receive a DRC cover (also known as a Walsh cover) corresponding to the sector. In an example embodiment, a DRC cover may be a 3-bit number mapping to one of 8 possible Walsh codes of length 8. Other sizes may be used of course for DRC covers (also known as Walsh covers).

In addition, based on the channel qualities, the AT may select a requested data rate for each of the carriers. Each carrier may have a different measured channel quality, e.g., based on the measured C/I ratio on the carrier's pilot signal. As a result, the AT may select or specify a different forward link data rate to the AN for each carrier, since the channel quality may be different for each carrier.

The AT may map the selected data rate (or packet format) to a DRC signal for each carrier. Thus, the data rates may be mapped to DRC values on a per carrier basis. Each DRC value (or DRC symbol) may be, for example, a four-bit DRC value, e.g., identifying one of up to 16 possible data rates (or packet formats) the AN may use (or is requested to use) to transmit data over the corresponding carrier in the forward link to the AT. Thus, the DRC values for each carrier typically reflect the channel quality for each carrier (for the selected sector).

Once an AT has selected a sector, and also identified a forward link data rate (or packet format) for each carrier (that has been mapped to a DRC value), the DRC cover of the selected sector is used to spread the DRC values for each carrier. Because the DRC covers are orthogonal to each other, the AN can determine the sector selected by the AT. Next, the spread DRC values for each carrier are then spread by a different Walsh spreading code in order to distinguish the DRC channel from other channels in the reverse link and to identify the carrier for the DRC value. Each of the resulting spread DRC values may then be transmitted over either the I-branch or the Q-branch of the transmitter, according to an example embodiment. In another example embodiment, at least one DRC value is transmitted over each of the I and Q branches, although the disclosure is not limited thereto.

FIG. 1 is a block diagram illustrating a DRC channel according to an example embodiment. In this example embodiment, if two DRC signals are to be transmitted on the reverse link carrier (each DRC signal providing DRC values corresponding to a forward link carrier), one DRC signal may be spread with $W^{32}_8$ (Walsh code 8 out of 32 possible Walsh codes) for example, while the other DRC signal may be spread with $W^{32}_{24}$ for example, and the two DRC signals may be transmitted over one slot. Other Walsh codes may be used, and this is merely an example. The transmission of multiple DRC values (for each of multiple forward link carriers) over a fewer number of reverse link carriers may be referred to as asymmetric multicarrier mode. It is considered symmetric, for example, because the number of DRC values/forward link carriers is greater than number of reverse link carriers used to transmit the DRC values, and thus, multiple DRC values may be transmitted over one or more reverse link carriers). In this example, both of these two DRC values may be transmitted on the Q-branch in the example embodiment illustrated in FIG. 1. In such case, it may be necessary to double the DRCLength as compared with 1×DO to substantially balance the I and Q power, such as using a DRCLength=4 slots for non-SHO, and a DRCLength=8 slots for SHO (where SHO means soft handoff region).

Referring to FIG. 1, DRC values or symbols (e.g., one 4-bit DRC value per slot) are input to a bi-orthogonal encoder 110. Encoder 110 performs bi-orthogonal encoding on the DRC values, and then signal point mapping block 112 maps the encoded DRC values to +1/−1 signal levels. The DRC cover values (e.g., one 3-bit value or symbol per slot) is mapped to a Walsh cover or Walsh code at block 114 to identify the transmitting sector for the forward link. The encoded DRC values are spread at multiplier 116 by the DRC cover value(s) (or Walsh covers) corresponding to the selected sector. Spreading with the DRC cover allows the AN to identify the sector selected by the AT.

The spread DRC values output from multiplier 116 are then spread at multiplier 118 by a different Walsh code for each carrier. For example, DRC values for carrier C1 may be spread by $W^{32}_8$ while DRC values for carrier C2 may be spread by $W^{32}_{24}$, for example. The spreading at multiplier 118 by different Walsh codes for DRC values of different carriers (different Walsh code per carrier) may be provided to: 1) distinguish the DRC channel from other channels on the reverse link (such as the ACK channel); and 2) identify the carrier corresponding to each DRC value (i.e., each different Walsh code used at multiplier 118 may typically map to a different carrier).

Figure 2:
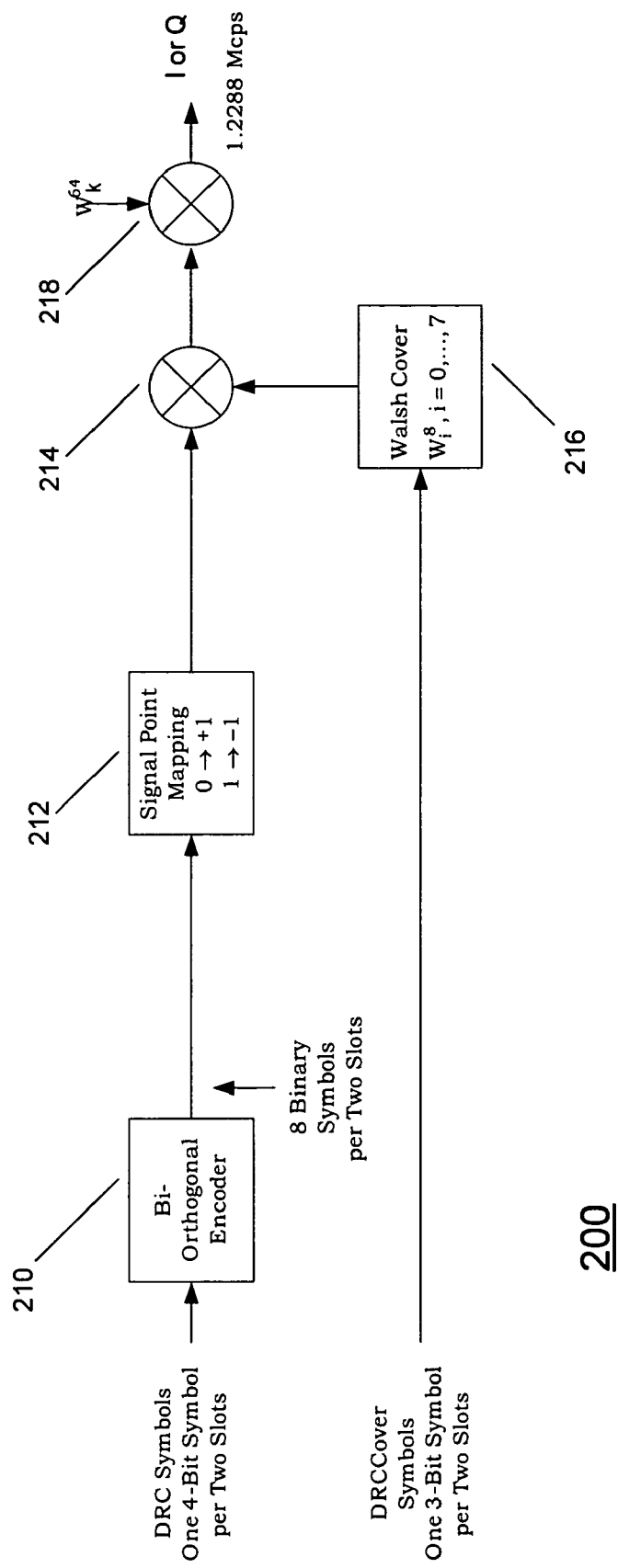
FIG. 2 is a block diagram illustrating a DRC channel according to another example embodiment.

FIG. 2 is a block diagram illustrating a DRC channel according to another example embodiment. FIG. 2 may be used to illustrate the DRC channel where three or four DRC values (corresponding to 3 or 4 carriers on the forward link) may be transmitted over the reverse link, for example over two slots. If, for example, three DRC values are to be transmitted on a reverse link carrier (each DRC value corresponding to a different carrier transmitted on the forward link), one DRC value (e.g., corresponding to carrier C1) may be transmitted over the I-branch and two DRC values (e.g., corresponding to carriers C2 and C3) may be transmitted on the Q-branch, with a DRCLength=2 for non-SHO. (note, according to an example embodiment, DRCLength for SHO is typically twice the DRCLength for Non-SHO, but is omitted in the following explanation for simplicity). The Walsh codes used for the transmission of three DRC values (e.g., corresponding to carriers C1, C2 and C3) may be, for example: $W^{64}_8$, $W^{64}_{40}$, $W^{64}_{24}$.

If four DRC signals are to be transmitted on the reverse link (e.g., the four DRC signals corresponding to four different carriers transmitted on the forward link), one DRC value (e.g., corresponding to carrier C1) may be transmitted on the I-Branch of the transmitter, and three DRC values (e.g., corresponding to carriers C2, C3 and C4 on forward link) may be transmitted on the Q-branch of the transmitter, with a DRCLength-4 for non-SHO, and with all four DRC values being transmitted over two slots. The Walsh codes used for spreading the four DRC values may be, for example: $W^{64}_8$, $W^{64}_{40}$, $W^{64}_{24}$, $W^{64}_{56}$, although this is merely an example.

Referring to FIG. 2, DRC values or symbols (e.g., one 4-bit DRC value per slot) are input to a bi-orthogonal encoder 210. Encoder 210 performs bi-orthogonal encoding on the DRC values, and then signal point mapping block 212 maps the encoded DRC values to +1/−1 signal levels. The DRC cover values (e.g., one 3-bit value or symbol per slot) is mapped to a Walsh cover or Walsh code at block 216 to identify the transmitting sector for the forward link. The encoded DRC values are spread at multiplier 214 by the Walsh covers (Walsh codes) corresponding to the selected sector. Spreading with the DRC cover allows the AN to identify the sector selected by the AT. The spread DRC values output from multiplier 214 are then spread at multiplier 218 using a different Walsh code for each carrier (e.g., $W^{64}_8$ for the DRC values for carrier C1, $W^{64}_{40}$ for carrier C2, $W^{64}_{24}$ for carrier C3, and $W^{64}_{56}$ for carrier C4). This is merely an example and the disclosure is not limited thereto. Each of the spread DRC values may then be transmitted via the I or Q branches as noted above.

Referring to the DRC channel of FIG. 2, by transmitting either three or four DRC values (for three or four forward link carriers) over just 2 slots via different orthogonal codes for each DRC signal, and with a DRCLength=2 slots (for three carriers, non-SHO) and with a DRCLength=4 slots (for four carriers, non-SHO), DRC values, at least in some cases, may be transmitted to an AN in a shorter period of time (fewer slots for transmission) and may be updated more frequently (due to shorter DRCLength), as compared to other proposals that have proposed transmitting multiple DRC signals via time division multiplexing, although the disclosure is not limited thereto. Also, at least in some cases, where both the I and Q branches are used to transmit DRC signals, the power transmitted on the I and Q branches may be more balanced than the case where all DRC signals are transmitted on just one of the branches, according to an example embodiment, although the disclosure is not limited thereto.

In general, according to an example embodiment, for N DRC signals transmitted on the reverse link carrier (e.g., with one DRC signal per carrier), the number of DRC signals transmitted on the I-branch may be L and the number of DRC signals transmitted on the Q-branch may be M, where N=L+M, may be allocated in a way so that the transmitted power of I and Q branches may be substantially balanced (and this may take into account the other channels transmitted on the reverse link). Thus, N may refer to the total number of forward link carriers (as well as the total number of DRC signals, one DRC signal per forward link carrier). Table 1 summarizes an example embodiment for N (total number of DRC signals or forward link carriers) up to 15.

TABLE 1

| N = Number of DRC signals | L = Number of DRC Signals on I Branch | M = Number of DRC Signals on Q Branch | non-SHO DRCLength | Walsh Codes Used |
|---|---|---|---|---|
| 2 | 0 | 2 | 4 | $W^{32}_8$, $W^{32}_{24}$ |
| 3 | 1 | 2 | 2 | $W^{64}_8$, $W^{64}_{40}$, $W^{64}_{24}$ |
| 4 | 1 | 3 | 4 | $W^{64}_8$, $W^{64}_{40}$, $W^{64}_{24}$, $W^{64}_{56}$ |
| 5 | 1 | 4 | 4 | $W^{128}_8$, $W^{128}_{72}$, $W^{128}_{24}$, $W^{128}_{88}$, $W^{128}_{40}$ |
| 6 | 2 | 4 | 4 | $W^{128}_8$, $W^{128}_{72}$, $W^{128}_{24}$, $W^{128}_{88}$, $W^{128}_{40}$, $W^{128}_{104}$ |
| 7 | 2 | 5 | 4 | $W^{128}_8$, $W^{128}_{72}$, $W^{128}_{24}$, $W^{128}_{88}$, $W^{128}_{40}$, $W^{128}_{104}$, $W^{128}_{56}$ |
| 8 | 3 | 5 | 4 | $W^{128}_8$, $W^{128}_{72}$, $W^{128}_{24}$, $W^{128}_{88}$, $W^{128}_{40}$, $W^{128}_{104}$, $W^{128}_{56}$, $W^{128}_{120}$ |
| 9 | 2 | 7 | 8 | $W^{256}_8$, $W^{256}_{136}$, $W^{256}_{72}$, $W^{256}_{24}$, $W^{256}_{152}$, $W^{256}_{40}$, $W^{256}_{168}$, $W^{256}_{56}$, $W^{256}_{184}$ |
| 10 | 3 | 7 | 8 | $W^{256}_8$, $W^{256}_{136}$, $W^{256}_{72}$, $W^{256}_{200}$, $W^{256}_{24}$, $W^{256}_{152}$, $W^{256}_{40}$, $W^{256}_{168}$, $W^{256}_{56}$, $W^{256}_{184}$ |
| 11 | 3 | 8 | 8 | $W^{256}_8$, $W^{256}_{136}$, $W^{256}_{72}$, $W^{256}_{200}$, $W^{256}_{24}$, $W^{256}_{152}$, $W^{256}_{40}$, $W^{256}_{168}$, $W^{256}_{56}$, $W^{256}_{184}$, $W^{256}_{88}$ |
| 12 | 4 | 8 | 8 | $W^{256}_8$, $W^{256}_{136}$, $W^{256}_{72}$, $W^{256}_{200}$, $W^{256}_{24}$, $W^{256}_{152}$, $W^{256}_{40}$, $W^{256}_{168}$, $W^{256}_{56}$, $W^{256}_{184}$, $W^{256}_{88}$, $W^{256}_{206}$ |
| 13 | 4 | 9 | 8 | $W^{256}_8$, $W^{256}_{136}$, $W^{256}_{72}$, $W^{256}_{200}$, $W^{256}_{24}$, $W^{256}_{152}$, $W^{256}_{40}$, $W^{256}_{168}$, $W^{256}_{56}$, $W^{256}_{184}$, $W^{256}_{88}$, $W^{256}_{206}$, $W^{256}_{104}$ |
| 14 | 5 | 9 | 8 | $W^{256}_8$, $W^{256}_{136}$, $W^{256}_{72}$, $W^{256}_{200}$, $W^{256}_{24}$, $W^{256}_{152}$, $W^{256}_{40}$, $W^{256}_{168}$, $W^{256}_{56}$, $W^{256}_{184}$, $W^{256}_{88}$, $W^{256}_{206}$, $W^{256}_{104}$, $W^{256}_{232}$ |
| 15 | 5 | 10 | 8 | $W^{256}_8$, $W^{256}_{136}$, $W^{256}_{72}$, $W^{256}_{200}$, $W^{256}_{24}$, $W^{256}_{152}$, $W^{256}_{40}$, $W^{256}_{168}$, $W^{256}_{56}$, $W^{256}_{184}$, $W^{256}_{88}$, $W^{256}_{206}$, $W^{256}_{104}$, $W^{256}_{232}$, $W^{256}_{120}$ |

Figure 3:
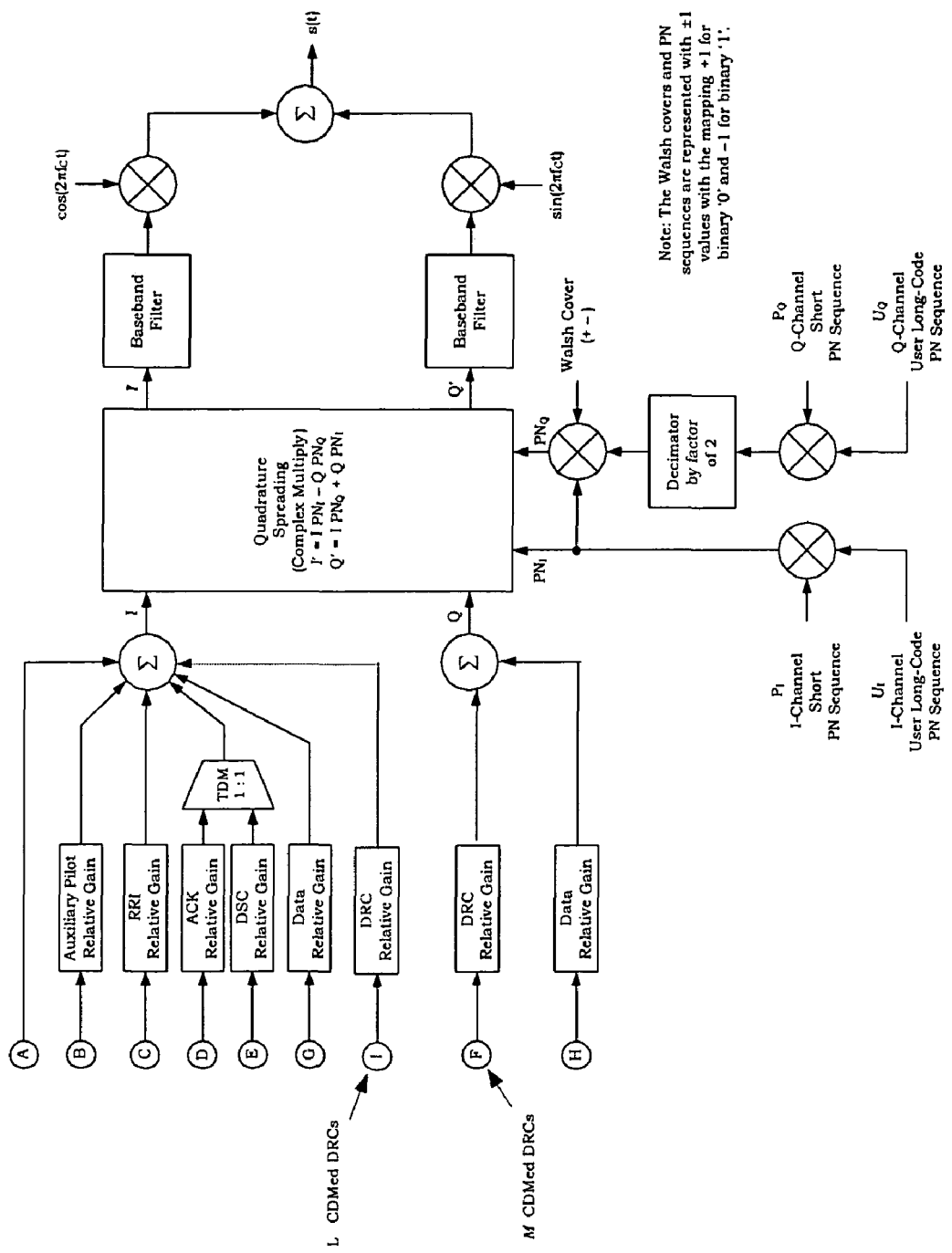
FIG. 3 is a block diagram illustrating the allocation of DRC signals to I and Q branches of a mobile transmitter according to an example embodiment.

FIG. 3 is a block diagram illustrating the allocation of DRC signals to I and Q branches of a mobile transmitter according to an example embodiment. According to the example embodiment shown in FIG. 3, the auxiliary pilot channel, the RRI channel, Ack channel, DSC channel, data channel and a portion of the DRC channel (including L code division multiplexed DRC signals) may be added together to form the resultant I-channel. The data channel and another portion of the DRC channel (including M code division multiplexed DRC signals) may be added together to form the resultant Q-channel. This allows some of the N (total number) of DRC signals to be allocated to the I-branch and some DRC signals to be allocated to the Q-branch. As noted above, each of the N (L+M) DRC signals may be spread using a different orthogonal spreading code or Walsh code. The resultant I and Q channels may then be quadrature spread (based on a PN long code, a PN short code, and Walsh codes), filtered, modulated onto the appropriate carrier for the reverse link and then transmitted as s(t).

According to an example embodiment, a mobile terminal or access terminal (AT) in a multicarrier system may monitor multiple pilot signals (e.g., one pilot signal per carrier) from one or more sectors (or base stations). Based on a measured channel quality for each carrier's pilot signal, the AT may select a best or preferred sector, and also select a data rate (e.g., requested data rate) for each carrier. The selected data rate for each carrier may then be mapped to a DRC value and spread by a DRC cover. The DRC covers may be orthogonal codes or Walsh codes to identify to the AN the sector selected by the AT for forward link transmission. The spread DRC values may then be spread by a different orthogonal Walsh code for each carrier. For example, DRC values for carrier C1 may be spread by a first Walsh code, DRC values for carrier C2 may be spread by a second Walsh code, DRC values for a carrier C3 may be spread by a third Walsh code, etc. The spreading of the DRC values (of different carriers) by different orthogonal Walsh codes corresponding to each carrier may: 1) distinguish the DRC channel from other channels on the reverse link (such as the ACK channel); and 2) identify the carrier corresponding to each DRC value (i.e., each different Walsh code used for spreading may typically map to a different carrier).

The spread DRC values may then be transmitted, with some (e.g., one or more) of the DRC values being transmitted over the I-branch and some (e.g., one or more) of the DRC values being transmitted over the Q-branch, although the disclosure is not limited thereto. According to an example embodiment, at least in some cases, transmitting DRC values over the I and Q branches may allow improved load balancing and/or reduce the Peak-to-Average (P/A) power ratio, as compared to transmitting DRC values over just the I or just the Q branch. In another example embodiment, a DRC value corresponding to each of a plurality of carriers may be spread with a different orthogonal code (e.g., Walsh code) and may be transmitted over just one of the I or Q branches, such as the Q-branch.

Figure 4:
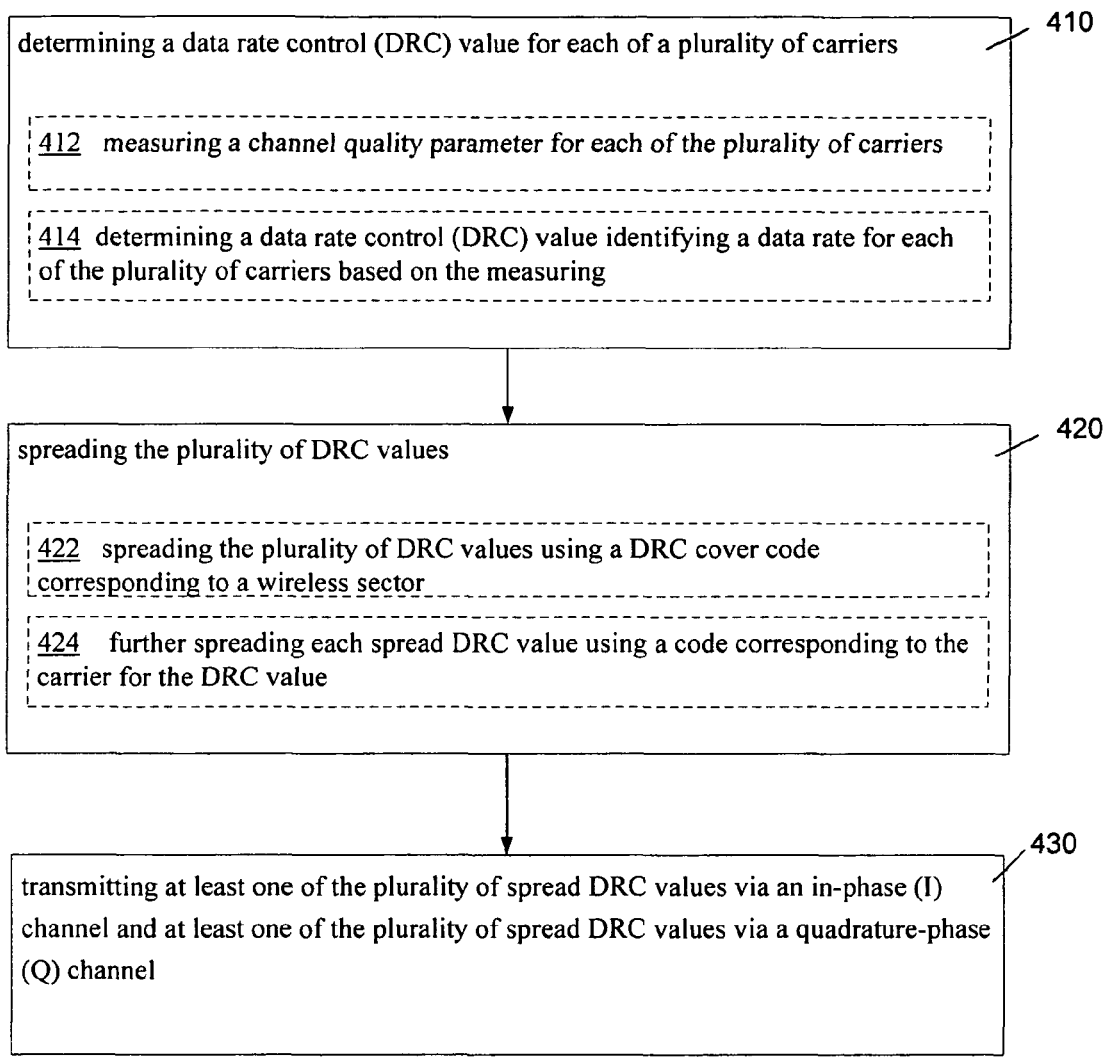
FIG. 4 is a flow chart illustrating operation of a wireless apparatus according to an example embodiment.

FIG. 4 is a flow chart illustrating operation of a wireless apparatus according to an example embodiment. At 410, a data rate control (DRC) value is determined for each of a plurality of carriers. Each DRC value, for example, may identify a data rate for a carrier. Operation 410 may include, for example, operations 412 and 414. At 412, a channel quality parameter may be measured for each of the plurality of carriers. This may be performed, for example, by receiving a pilot signal associated with each carrier, and measuring a signal-to-noise ratio or other channel quality parameter for each pilot. At 414, a DRC value is identified for each of the plurality of carriers based on the measuring (e.g., select a data rate, corresponding to a DRC value, based on a channel quality of the pilot signal or forward link carrier).

At 420, the plurality of DRC values are spread. This spreading may involve spreading using a DRC cover code, which may be associated with a base station or wireless sector (e.g., DRC cover code may be used to identify a selected sector). At 422, the plurality of DRC values are spread using a DRC cover code corresponding to a wireless sector. Operation 422 may include, for example, determining a wireless sector from which to receive data via a forward link channel, and spreading the plurality of DRC values using a Walsh code corresponding to the determined wireless sector.

The spreading at 420 may also (or alternatively) involve spreading each DRC value using a Walsh code corresponding to (or identifying) the carrier for the DRC value, for example, at operation 424. Operation 424 may involve determining a Walsh code for each of the carriers, and then spreading each DRC value using the Walsh code corresponding to the carrier. Each carrier may have a different Walsh code (to allow identification of the carrier based on the Walsh code). Alternatively, in some cases a same Walsh code may be used for two different carriers where the DRC values for these two carriers are transmitted over different I/Q channels (e.g.., DRC value for one carrier transmitted over an in-phase channel and the DRC value for the other carrier transmitted over the Quadrature-phase channel), according to another example embodiment.

At 430, at least one of the plurality of spread DRC values are transmitted via an in-phase (I) channel and at least one of the plurality of spread DRC values are transmitted via a Quadrature-phase (Q) channel. Thus, for example, a first DRC value for a first carrier may be transmitted over an I channel, while second and third DRC values for second and third carriers, respectively, may be transmitted over a Q channel, for example. In the case of 4 carriers, a DRC value for the first carrier may be transmitted over the I channel, while DRC values for the other three carriers may be transmitted over the Q channel, for example. These are merely some examples and the disclosure is not limited thereto.

Figure 5:
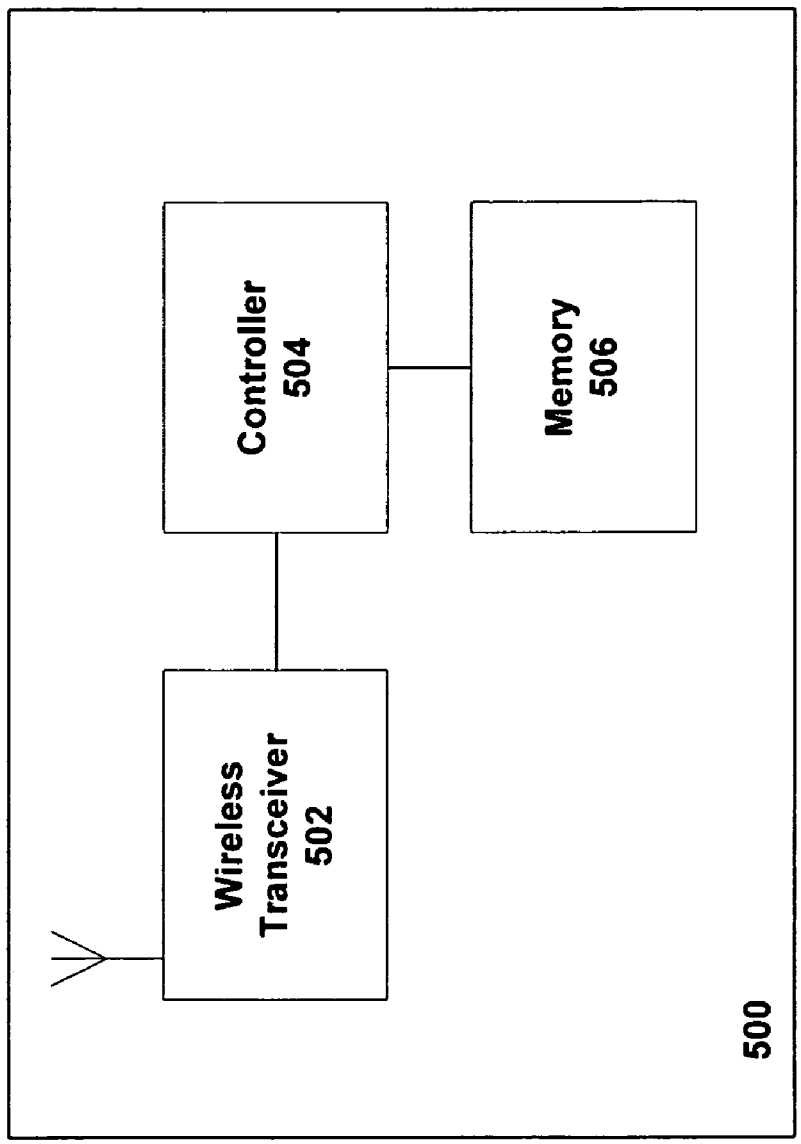
FIG. 5 is a block diagram illustrating an apparatus that may be provided in a wireless apparatus or wireless node according to an example embodiment.

FIG. 5 is a block diagram illustrating an apparatus 500 that may be provided in a wireless apparatus or wireless node according to an example embodiment. The example wireless node may include, for example, a wireless transceiver 502 to transmit and receive signals, a controller 504 to control operation of the node or apparatus and execute instructions or software, and a memory 506 to store data and/or instructions. Controller 504 may be programmable, and capable of executing software or other instructions stored in memory or on other computer media to perform the various tasks and functions described above with reference to FIGS. 1-4, for example.

For example, wireless apparatus 500 may be programmed or adapted to determine data rate control (DRC) values for each of a plurality of forward link carriers (e.g., by controller 504), and to transmit (e.g., via transceiver and/or other blocks shown above in FIGS. 1-3) via a reverse link channel at least a first of the DRC values via an in-phase (I) channel and at least a second of the DRC values via a Quadrature-phase (Q) channel. According to an example embodiment, the wireless apparatus 500 may be compliant or at least partially compliant with CDMA2000 EV-DO Revision B/3GPP2 C.S0024-B, and/or may be compliant with other standards or technologies. The wireless apparatus 500 may operate, for example, in an asymmetric multicarrier mode in which a number of the forward link carriers used for data transmission is greater than a number of reverse link carriers used to transmit DRC values for the forward link carriers. This may involve transmitting DRC values for one or more carriers over an I channel, and transmitting DRC values for one or more carriers over a Q channel, according to an example embodiment.

The wireless apparatus 500 may include, for example, a bi-orthogonal encoder (e.g., 210) to encode the DRC values, a first multiplier (e.g., 214) to spread the encoded DRC values using a DRC cover code corresponding to a wireless sector, and a second multiplier (e.g., 218) to further spread each DRC value using a Walsh code corresponding to the carrier for the DRC value, although this merely describes some example embodiments, and the disclosure and embodiments are not limited thereto.

According to another example embodiment, wireless apparatus 500 may be programmed or adapted to transmit at least a first data rate control (DRC) value via an in-phase (I) channel and at least a second DRC value via a Quadrature-phase (Q) channel, for example. The first DRC value may be associated with a first forward link carrier and the second DRC value may be associated with a second forward link carrier, according to an example embodiment. Embodiments of the present disclosure may be found, for example, in CDMA2000 EV-DO Revision B, published as 3GPP2 C.S0024-B.

It should be understood that embodiments of the present disclosure may be used in a variety of devices and applications. Although the present disclosure is not limited in this respect, the techniques, methods, circuits or systems disclosed herein may be used in many different apparatus such as in the transmitters and receivers of a radio system, for example. Radio systems intended to be included within the scope of the present disclosure include, by way of example only, wireless network devices and systems such as wireless local area networks (WLAN) devices and wireless wide area network (WWAN) devices including wireless network interface devices, wireless network interface cards (NICs), base stations, access points (APs), gateways, bridges, hubs, cellular radiotelephone communication systems, cellular devices, Access Terminals, Access Network devices, access points, other fixed or mobile transceivers, portable computers, mobile phones, satellite communication systems, two-way radio communication systems, pagers, personal communication systems (PCS), personal computers (PCs), personal digital assistants (PDAs), mobile stations and other wireless devices or radio systems, although the scope of the disclosure is not limited in this respect.

In addition, the various embodiments of the present disclosure are applicable to a wide variety of technologies, communication protocols and standards. The examples described herein are provided merely for illustrative purposes and the disclosure is not limited thereto.

In addition, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in hardware, software, firmware, special purpose circuits or logic, general purpose hardware or controller or other computing device, etc., or some combination thereof.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the disclosure or disclosed embodiments.

What is claimed is:

1. A method comprising:
   determining a data rate control (DRC) value for each of a plurality of forward link carriers of a multi-carrier transmission from a base station, the plurality of DRC values including at least a first DRC value associated with a first carrier of the plurality of forward link carriers and a second DRC value associated with a second carrier of the plurality of forward link carriers;
   spreading the first DRC value and the second DRC value;
   transmitting, via a reverse link, at least the first spread DRC value via an in-phase (I) channel input to a quadrature spreading block and at least the second spread DRC value via a quadrature-phase (Q) channel input to the quadrature spreading block.

2. The method of claim 1 wherein the determining comprises:
   measuring a channel quality parameter for each of the plurality of carriers;
   determining a data rate control (DRC) value identifying a data rate for each of the plurality of forward link carriers based on the measuring.

3. The method of claim 2 wherein the measuring comprises:
   receiving a pilot signal associated with each of the forward link carriers; and
   measuring a signal to-noise-ratio or other channel quality parameter for each pilot signal.

4. The method of claim 1 wherein the spreading comprises spreading the first DRC value and the second DRC value using a Walsh code corresponding to a wireless sector.

5. The method of claim 1 wherein the spreading comprises:
   determining a wireless sector from which to receive data via a forward link channel;
   spreading the first DRC value and the second DRC value using a Walsh code corresponding to the determined wireless sector.

6. The method of claim 1 wherein the spreading comprises:
   determining a Walsh code for each of the forward link carriers;
   spreading each DRC value using the Walsh code corresponding to the carrier.

7. The method of claim 6 wherein the spreading comprises spreading each DRC value using a different Walsh code for each of the carriers.

8. The method of claim 1 wherein the spreading comprises:
   spreading the first DRC value and the second DRC value using a DRC cover code corresponding to a wireless sector; and
   further spreading each spread DRC value using a code corresponding to the carrier for the DRC value.

9. The method of claim 1 wherein the determining comprises determining a first data rate control (DRC) value for a first carrier, a second DRC value for a second carrier, and a third DRC value for a third carrier;
    wherein the spreading comprises spreading the first, second and third DRC values; and
    wherein the transmitting comprises:
    transmitting the first spread DRC value via an in-phase (I) channel input to a quadrature spreading block; and
    transmitting the second and third spread DRC values via a quadrature-phase (Q) channel input to the quadrature spreading block.

10. The method of claim 1 wherein the determining comprises determining a first data rate control (DRC) value for a first carrier, a second DRC value for a second carrier, a third DRC value for a third carrier, and a fourth DRC value for a fourth carrier;
    wherein the spreading comprises spreading the first, second, third and fourth DRC values; and
    wherein the transmitting comprises:
    transmitting the first spread DRC value via an in-phase (I) channel input to the quadrature spreading block; and
    transmitting the second, third and fourth spread DRC values via a quadrature-phase (Q) channel input to the quadrature spreading block.

11. A wireless apparatus comprising a memory storing software instructions and a controller which together are adapted to cause the wireless apparatus to:
    determine data rate control (DRC) values for each of a plurality of forward link carriers of a multi-carrier transmission from a base station, the DRC values including at least a first DRC value associated with a first carrier of the plurality of forward link carriers and a second DRC value associated with a second carrier of the plurality of forward link carriers;
    transmit via a reverse link channel at least a first of the DRC values via an in-phase (I) channel input to a quadrature spreading block and at least a second of the DRC values via a Quadrature-phase (Q) channel input to the quadrature spreading block.

12. The wireless apparatus of claim 11 wherein the wireless apparatus is compliant with CDMA2000 EV-DO Revision B/3GPP2 C.S0024-B.

13. The wireless apparatus of claim 11 wherein the apparatus is operating in an asymmetric multicarrier mode in which a number of the forward link carriers used for data transmission is greater than a number of reverse link carriers used to transmit DRC values for the forward link carriers.

14. The wireless apparatus of claim 11 and further comprising:
    a bi-orthogonal encoder to encode the DRC values;
    a first multiplier to spread the encoded DRC values using a DRC cover code corresponding to a wireless sector; and
    a second multiplier to further spread each DRC value using a Walsh code corresponding to the carrier for the DRC value.

15. A wireless apparatus comprising a controller and a memory storing software instructions which together are configured to cause the wireless apparatus to transmit, via a reverse link, at least a first data rate control (DRC) value via an in-phase (I) channel input to a quadrature spreading block and at least a second DRC value via a Quadrature-phase (Q) channel input to the quadrature spreading block, the first DRC value associated with a first forward link carrier and the second DRC value associated with a second forward link carrier, the first and second forward link carriers being part of a multi-carrier transmission from a base station.

16. The wireless apparatus of claim 15 wherein the wireless apparatus is compliant with CDMA2000 EV-DO Revision B/3GPP2 C.S0024-B.

17. The wireless apparatus of claim 15 and further comprising:
    a bi-orthogonal encoder to encode the DRC values;
    a first multiplier to spread the encoded DRC values using a DRC cover code corresponding to a wireless sector; and
    a second multiplier to further spread the first DRC value using a Walsh code corresponding to the first forward link carrier, and to further spread the second DRC value using a Walsh code corresponding to the second forward link carrier.

* * * * *